US010007151B2

(12) United States Patent
Jeon et al.

(10) Patent No.: US 10,007,151 B2
(45) Date of Patent: Jun. 26, 2018

(54) DISPLAY PANEL AND DISPLAY DEVICE INCLUDING THE SAME

(71) Applicant: Samsung Display Co., Ltd., Yongin-Si, Gyeonggi-Do (KR)

(72) Inventors: Jae-hwan Jeon, Asan-si (KR); Jungsoo Ok, Asan-si (KR); Sung-dong Park, Asan-si (KR); Sanghwan Lee, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 137 days.

(21) Appl. No.: 15/144,930

(22) Filed: May 3, 2016

(65) Prior Publication Data
US 2016/0363795 A1    Dec. 15, 2016

(30) Foreign Application Priority Data

Jun. 10, 2015   (KR) .................. 10-2015-0081833
Nov. 3, 2015    (KR) .................. 10-2015-0154078

(51) Int. Cl.
*G02F 1/1339*   (2006.01)
*G02F 1/1335*   (2006.01)
*G02F 1/1333*   (2006.01)

(52) U.S. Cl.
CPC ...... *G02F 1/1339* (2013.01); *G02F 1/133512* (2013.01); *G02F 1/133528* (2013.01); *G02F 2001/13398* (2013.01); *G02F 2001/133388* (2013.01)

(58) Field of Classification Search
CPC .................. G02F 1/1339; G02F 2001/133388
See application file for complete search history.

(56) References Cited

U.S. PATENT DOCUMENTS

2005/0117197 A1*  6/2005  Ide ..................... G02F 1/1333
                                                    359/291
2015/0124180 A1   5/2015  Lee et al.
2015/0177548 A1   6/2015  Jeon et al.

FOREIGN PATENT DOCUMENTS

| KR | 10-0290775 B1   | 3/2001 |
| KR | 1020130013041 A | 2/2013 |
| KR | 1020130079159 A | 7/2013 |
| KR | 1020140058106 A | 5/2014 |
| KR | 1020140072634 A | 6/2014 |
| KR | 1020120054939 A | 5/2015 |
| KR | 1020160100051 A | 8/2016 |

* cited by examiner

Primary Examiner — Kendrick Hsu
(74) Attorney, Agent, or Firm — Cantor Colburn LLP

(57) ABSTRACT

A display panel includes a first substrate defining a display area thereof in which an image is displayed and a pad area thereof which is disposed extended from an edge of the display area and in which the image is not displayed; a second substrate disposed overlapping the display area of the first substrate; a spacer disposed on the pad area of the first substrate; and an upper polarizing plate disposed on the second substrate, the upper polarizing plate extended further than the second substrate to be disposed on the spacer on the pad area of the first substrate The spacer includes a body portion and a light-blocking layer which is disposed on a surface of the body portion.

25 Claims, 5 Drawing Sheets

DISPLAY PANEL AND DISPLAY DEVICE INCLUDING THE SAME

This application claims priority to Korean Patent Application Nos. 10-2015-0081833, filed on Jun. 10, 2015, and 10-2015-0154078, filed on Nov. 3, 2015, and all the benefits accruing therefrom under 35 U.S.C. § 119, the content of which in their entirety are hereby incorporated by reference.

BACKGROUND (1) Field

The invention relates to a display panel and a display device including the same, and more particularly, to a borderless display panel and a display device including the same.

(2) Description of the Related Art

Display devices are classified into a liquid crystal display ("LCD") device, an organic light emitting diode display ("OLED") device, a plasma display panel ("PDP") device, an electrophoretic display device, and the like.

A display device includes a display panel, various kinds of frames for supporting and accommodating the display panel, and various kinds of optical sheets, which are sequentially laminated. Also, the display panel includes a display area and a non-display area which is disposed around the display area. A frame may be disposed to cover the non-display area of the display panel.

SUMMARY

One or more exemplary embodiment of the invention provides a borderless display panel in which a cover window of a conventional borderless display panel is omitted to reduce manufacturing costs, and a display device including the same.

An exemplary embodiment of the invention provides a display panel including: a first substrate defining a display area thereof in which an image is displayed and a pad area thereof which is disposed extended from an edge of the display area and in which the image is not displayed; a second substrate disposed overlapping the display area of the first substrate; a spacer disposed on the pad area of the first substrate; and an upper polarizing plate disposed on the second substrate, the upper polarizing plate extended further than the second substrate to be disposed on the spacer on the pad area of the first substrate. The spacer includes a body portion and a light-blocking layer which is disposed on a surface of the body portion.

In an exemplary embodiment, the light-blocking layer may be disposed between the first substrate and the body portion.

In an exemplary embodiment, the light-blocking layer may be disposed between the body portion and the upper polarizing plate.

In an exemplary embodiment, the body portion may include a tempered glass or polymer resin.

In an exemplary embodiment, the display panel may further include a conductive coating layer disposed between the first substrate and the spacer.

In an exemplary embodiment, the display panel may further include an adhesion member disposed between the first substrate and the spacer.

In an exemplary embodiment, the display panel may further include a plurality of pads which is disposed in the pad area of the first substrate and provides driving signals to the display area of the first substrate to drive the display area, and a flexible printed circuit board which is connected to the plurality of pads and provides the driving signals to the plurality of pads.

In an exemplary embodiment, the display panel may further include a light blocking member disposed on an edge of the second substrate, the edge of the second substrate adjacent to the pad area of the first substrate.

In an exemplary embodiment, a height defined from the first substrate to a top surface of the second substrate overlapping the display area of the first substrate may be substantially the same as that from the first substrate to a top surface of the spacer on the pad area of the first substrate.

In an exemplary embodiment, the spacer on the pad area of the first substrate may contact the second substrate overlapping the display area of the first substrate.

In an exemplary embodiment, the display panel may further include a liquid crystal layer disposed between the first substrate and the second substrate.

In an exemplary embodiment, the display panel may further include a lower polarizing plate disposed on a rear surface of the first substrate.

In an exemplary embodiment of the invention, a display device includes: a display panel configured to display an image; and a frame configured to overlap an edge of a rear surface of the display panel to support the display panel. The display panel includes: a first substrate defining a display area thereof in which the image is displayed and a pad area thereof which is disposed adjacent to an edge of the display area and in which the image is not displayed; a second substrate disposed overlapping the display area of the first substrate; a spacer disposed on the pad area of the first substrate; and an upper polarizing plate disposed on the second substrate, the upper polarizing plate extended further than the second substrate to be disposed on the spacer on the pad area of the first substrate. The spacer includes a body portion and a light-blocking layer disposed on a surface of the body portion.

In an exemplary embodiment, the light-blocking layer may be disposed between the first substrate and the body portion.

In an exemplary embodiment, the light-blocking layer may be disposed between the body portion and the upper polarizing plate.

In an exemplary embodiment, the body portion may include a tempered glass or polymer resin.

In an exemplary embodiment, the display device may further include a conductive coating layer disposed between the first substrate and the spacer.

In an exemplary embodiment, the display device may further include a light blocking member disposed on an edge of the second substrate, the edge of the second substrate adjacent to the pad area of the first substrate.

In an exemplary embodiment, a height defined from the first substrate to a top surface of the second substrate overlapping the display area of the first substrate may be substantially the same as that from the first substrate to a top surface of the spacer on the pad area of the first substrate.

In an exemplary embodiment, the spacer on the pad area of the first substrate may contact the second substrate overlapping the display area of the first substrate.

In an exemplary embodiment of the invention, a display panel includes: a first substrate defining a display area thereof in which an image is displayed and a curved area thereof which extends from an edge of the display area and in which the image is not displayed, the curved area defining a first curved surface of the first substrate; a second substrate disposed overlapping the display area of the first substrate;

a spacer disposed on the curved area of the first substrate, the spacer defining a second curved surface thereof corresponding to the first curved surface of the first substrate; and a polarizing plate disposed on the second substrate, the polarizing plate extended further than the second substrate to be disposed on the spacer on the curved area of the first substrate.

In an exemplary embodiment, the display panel is disposed in a plane defined by first and second directions crossing each other, the curved area of the first substrate may further define a pad area of the first substrate, the pad area lengthwise extending in the first direction, and the second curved surface defined by the spacer is bent with respect to a bending axis that is lengthwise parallel to the first direction.

In an exemplary embodiment, the spacer may include a body portion and a light-blocking layer disposed on a surface of the body portion, and the spacer may be attached to the polarizing plate.

In an exemplary embodiment, the light-blocking layer may be disposed between the body portion and the polarizing plate.

In an exemplary embodiment, the body portion may be disposed between the light-blocking layer and the polarizing plate.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
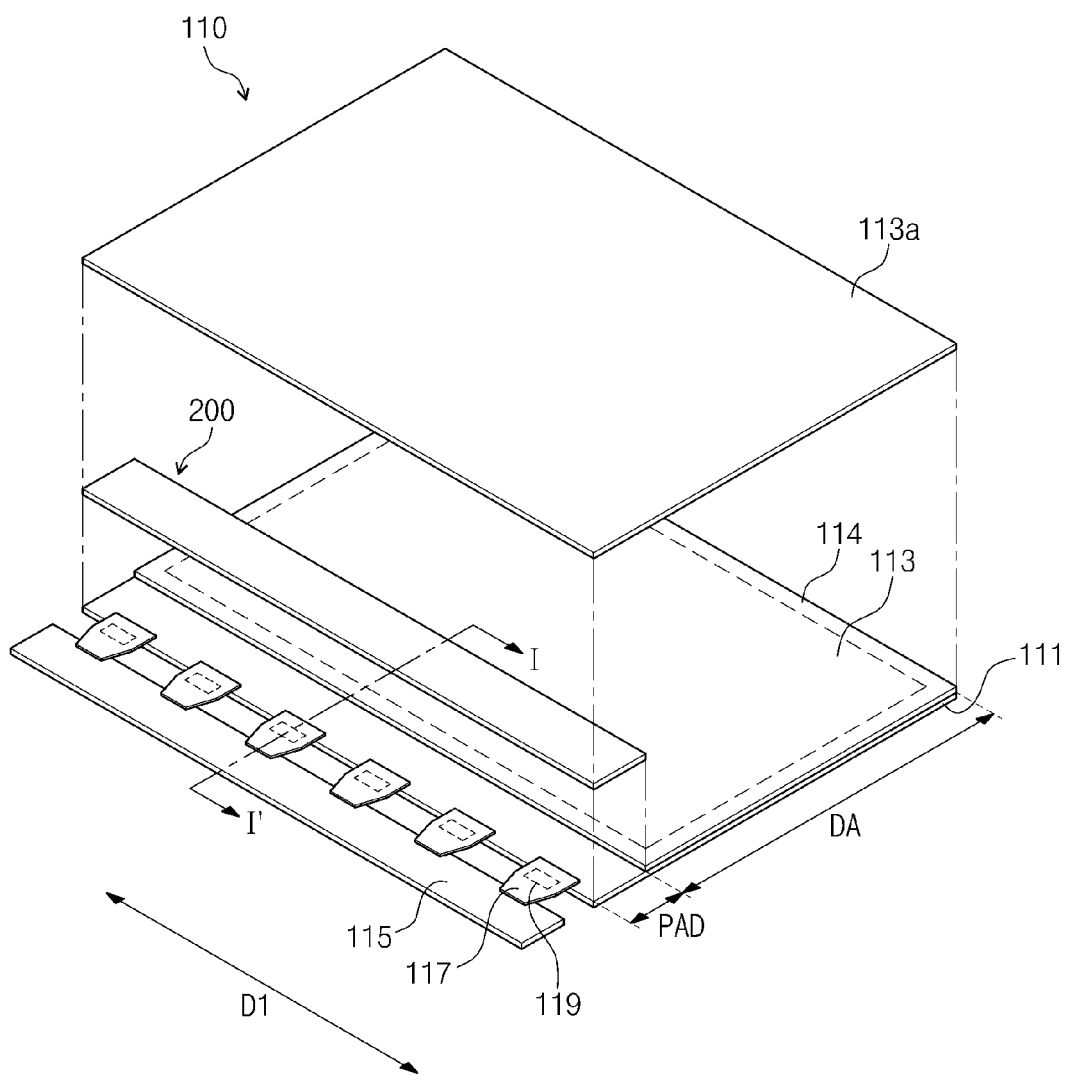
FIG. 1 is an exploded perspective view of an exemplary embodiment of a display panel according to the invention.

Hereinafter, exemplary embodiments of the invention will be described with reference to the accompanying drawings.

Since the present disclosure may have diverse modified embodiments, exemplary embodiments are illustrated in the drawings and are described in the detailed description of the invention. However, this does not limit the present disclosure within specific embodiments and it should be understood that the present disclosure covers all the modifications and/or equivalents and replacements within the idea and technical scope of the present disclosure.

In this disclosure below, when one part (or element, device, etc.) is referred to as being 'connected' to another part (or element, device, etc.), it should be understood that the former can be 'directly connected' to the latter, or connected to the latter via an intervening part (or element, device, etc.). In contrast, when one part (or element, device, etc.) is referred to as being 'directly connected' to another part (or element, device, etc.), there are no intervening elements present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. Furthermore, when it is described that one comprises (or includes or has) some elements, it should be understood that it may comprise (or include or has) only those elements, or it may comprise (or include or have) other elements as well as those elements if there is no specific limitation.

It will be understood that although the terms of first and second are used herein to describe various elements, these elements should not be limited by these terms. The terms are only used to distinguish one component from other components. For example, a first element referred to as a first element in one embodiment can be referred to as a second element in another embodiment.

In the following description of the invention, a detailed description of known functions and configurations incorporated herein will be omitted to avoid making the subject matter of the invention unclear and, in every possible case, like reference numerals are used for referring to the same or similar elements in the description and drawings.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ± 30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

To make a beautiful exterior design, a borderless display device including a display area in which an image is displayed and a non-display area which is disposed around the display area and in which an image is not displayed, in which a width of a frame disposed covering the non-display area is decreased or the frame is entirely omitted to minimize the visible boundary or stepped portion of the display device, is suggested.

Since even the borderless display device still has a display panel which defines the non-display area around the display area, a cover window, on which a light-blocking printed layer is provided, may be disposed on the display panel to reduce or effectively prevent the non-display area from being seen.

Hereinafter, although exemplary embodiments of a display device according to the invention are described with respect to a liquid crystal display device, the invention is not limited thereto. In exemplary embodiments, for example, the display device may include an organic light emitting display device or a plasma display device in addition to the liquid crystal display device.

Also, although exemplary embodiments of the display device are described with respect to an edge type backlight unit, the invention is not limited thereto. In exemplary embodiments, for example, the display device may include a direct type backlight unit or a corner type backlight unit.

Figure 2A:
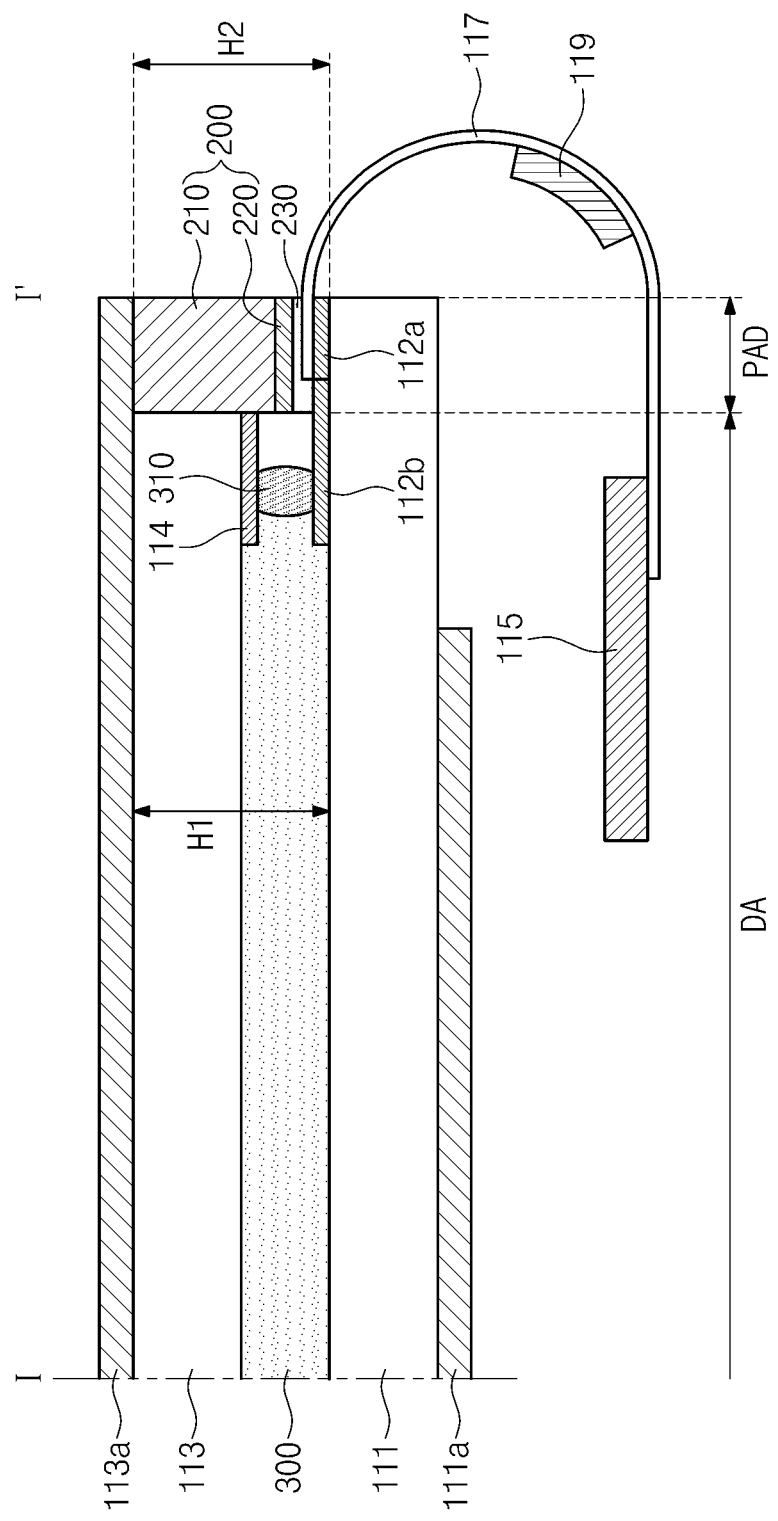
FIG. 2A is a cross-sectional view taken along line I-I' of FIG. 1.

FIG. 1 is an exploded perspective view of an exemplary embodiment of a display panel according to the invention, and FIG. 2A is a cross-sectional view taken along line I-I' of FIG. 1.

Referring to FIGS. 1 and 2A, a display panel 110 includes a first display substrate 111 including a display area DA in which an image is displayed and a pad area PAD which is disposed at one edge of the display area DA and in which an image is not displayed, a second display substrate 113 disposed on the display area DA of the first display substrate 111, a liquid crystal layer 300 disposed between the first display substrate 111 and the second display substrate 113, a spacer 200 disposed on the pad area PAD of the first display substrate 111, a lower polarizing plate 111a disposed on a rear surface of the first display substrate 111, and an upper polarizing plate 113a disposed on a front surface of the display second substrate 113 and on a top surface of the spacer 200. The display panel 110 may be disposed in a plane defined by a first direction D1 and a second direction crossing the first direction D1. A thickness (or cross-sectional direction) of the display panel 110 may be defined in a third direction orthogonal to both the first D1 and second directions.

The first display substrate 111 includes the display area DA in which a gate line, a data line and a pixel electrode are provided in plural disposed on a first base substrate, and the pad area PAD in which a connecting wiring 112b for connecting a pad 112a provided in plural to the gate lines and the data lines is disposed. The first display substrate 111 at the display area DA extends to define a portion of the first display substrate 111 at the pad area PAD.

The pad area PAD is disposed adjacent to at least one edge of the display area DA. The plurality of pads 112a disposed on the pad area PAD of the first display substrate 111 transfers various types of driving signals provided from outside the display panel 110 to the display area DA.

The second display substrate 113 is disposed on the display area DA of the first display substrate 111. The first display substrate 111 may extend further than the second display substrate 113. Where the first display substrate 111 extends further then the second display substrate 113, a boundary or stepped portion of the display device may be formed.

A common electrode that includes or is formed of a transparent conductive material, a color filter and a light blocking member are disposed on a second base substrate within the second display substrate 113. The color filter may include red, green and blue color filters. According to an exemplary embodiment of the invention, the display panel 110 includes a light blocking member 114 disposed at an edge of a rear surface of the second display substrate 113. The light blocking member 114, which is called a black matrix, may include metal such as chrome oxide (CrOx) or an opaque organic film material.

Referring to FIG. 1, for example, the display panel 110 defines relatively long sides thereof lengthwise extended in the first direction D1, relatively short sides thereof lengthwise extended in the second direction (e.g., perpendicular to the first direction D1, and the third direction in which the first display substrate 111 and the second display substrate 113 are stacked.

The liquid crystal layer 300 is disposed between the first display substrate 111 and the second display substrate 113 and rearranged by an electric field formed between and by the pixel electrode and the common electrode. The rearranged liquid crystal layer 300 adjusts a transmittance of light emitted from a backlight unit of the display device, and the adjusted light passes through the color filter to display an image to outside the display panel 110.

The liquid crystal layer 300 is disposed to be filled in a space defined respectively by a sealant 310 disposed between the first display substrate 111 and the second display substrate 113. The sealant 310 may be disposed on one of the first and second display substrates 111 and 113 and couple the first display substrate 111 to the second display substrate 113.

A space between cells, e.g., cellgap, of about 2.0 micrometers (um) to about 5.0 um defined between the first display substrate 111 and the second display substrate 113 may be maintained by the sealant 310. In an exemplary embodiment, a cellgap of about 3.3 um to about 3.7 um may be maintained.

Also, the lower polarizing plate 111a is disposed on the rear surface of the first display substrate 111, and the upper polarizing plate 113a is disposed on top surfaces of the second display substrate 113 and the spacer 200. The upper polarizing plate 113a on the top surface of the second display substrate 113 defines a portion of the upper polarizing plate 113a extended further than the second display substrate 113. In the exemplary embodiment of the display panel 110 according to the invention, since the upper polarizing plate 113a extends from the top surface of the second display substrate 113 to the top surface of the spacer 200, a boundary or stepped portion of the display panel 110 may be minimally seen to a user. The upper polarizing plate 113a extended from the top surface of the second display substrate 113 to the top surface of the spacer 200 may be disposed in a single plane (e.g., non-stepped) such that the boundary or stepped portion of the display panel 110 may be minimally seen to a user. The lower polarizing plate 111a may define a rearmost element of the display panel 110 and the upper polarizing plate 113a may define the frontmost element of the display panel 110.

That is, a height H1 from the first display substrate 111 to the top surface of the second display substrate 113 may be substantially the same as the height H2 from the first display substrate 111 to the top surface of the spacer 200.

The polarizing plate 113a may pass only specific polarized light of light provided from the outside therethrough, and absorb or block a remainder of the light. The lower polarizing plate 111a may pass only specific polarized light of light outputted from the backlight unit therethrough, and absorb or block a remainder of the light. When the display panel 110 is an organic light emitting display panel, the lower polarizing plate 111a may be omitted.

A driving circuit board 115 may be disposed on at least one side of the display panel 110. The driving circuit board 115 may provide various kinds of control signals and power signals for driving the display panel 110.

The display panel 110 and the driving circuit board 115 may be electrically connected by at least one flexible printed circuit board 117. The flexible printed circuit board 117 may include a chip on film ("COF") or a tape carrier package ("TCP"), and the number of the flexible printed circuit board 117 may have various values according to the size and driving method of the display panel 110.

The flexible printed circuit board 117 is attached to one or more of the plurality of pads 112a of the first display substrate 111. The flexible printed circuit board 117 and the first display substrate 111 may be electrically connected to each other by using an anisotropic conductive film ("ACF"). The ACF may include a thermal-hardening resin film including conductive particles.

A driving chip 119 may be mounted on the flexible printed circuit board 117. The driving chip 119 may generate various kinds of driving signals for driving the display panel 110. The driving chip 119, as one chip in which a timing controller and a data driving circuit are integrated with each other, may include a driver integrated circuit ("IC") chip or a source integrated circuit ("IC") chip.

The spacer 200 is disposed on the pad area PAD of the first substrate display 111. The spacer 200 may be disposed where the first display substrate 111 extends further then the second display substrate 113 to define the boundary or stepped portion of the display device. Here, the spacer 200 may be disposed to contact the second substrate 113.

The spacer 200 includes a body portion 210 and a printed layer 220 which is disposed on at least one surface selected from opposing top and bottom surfaces of the body portion 210. Also, an adhesion member 230 is disposed between the spacer 200 and the first display substrate 111.

Figure 2B:
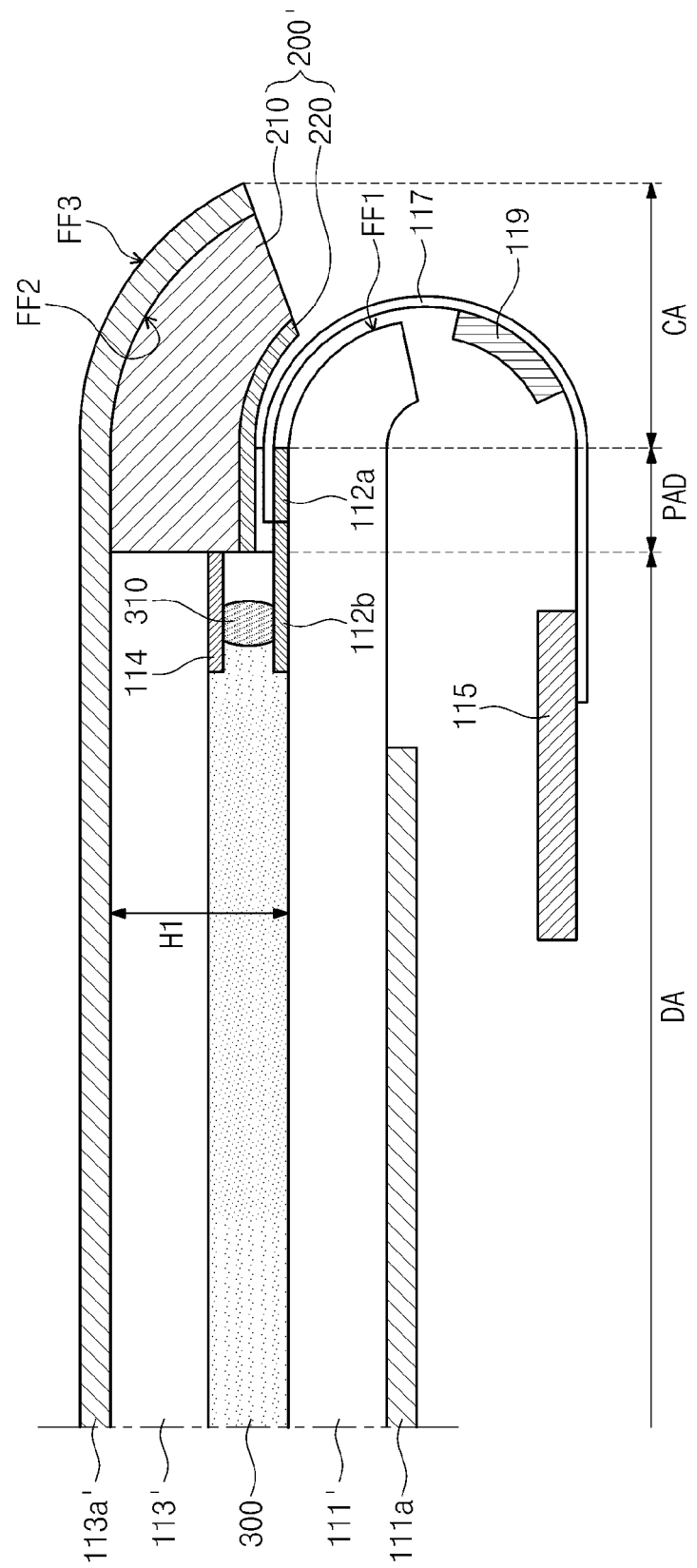
FIG. 2B is a cross-sectional view of another exemplary embodiment of a display panel according to the invention.

FIG. 2B is a cross-sectional view of another exemplary embodiment of a display panel according to the invention.

Referring to FIG. 2B, a first display substrate 111' may include a display area DA in which an image is displayed and a curved area CA in which an image is not displayed and which extends from the display area DA and includes or defines a first curved surface FF1. The first display substrate 111' at the display area DA extends to define a portion of the first display substrate 111 at the curved area CA. For convenience of description, "curved area" may hereinafter refer to a total of the pad area PAD and the curved area CA indicated in the drawings.

In more detail, the first display substrate 111' of the display panel of FIG. 2B, unlike the first display substrate 111 of FIG. 2A, may include the first curved surface FF1 extending from one side of the display area DA. The portion of the first display substrate 111' at the curved area CA defines the first curved surface FF1 of the first display substrate 111'.

As the first display substrate 111' includes or defines the curved area CA, a spacer 200' extended into the curved area CA may include or define a second curved surface FF2 of the second display substrate 113' corresponding to the first curved surface FF1 of the first display substrate 111'. Also, an upper polarizing plate 113a' may include or define a third curved surface FF3 corresponding to the first curved surface FF1 of the first display substrate 111'. As used herein, "corresponding" may indicate being extended parallel to each other or having a same shape or curvature.

Each of the second curved surface FF2 and the third curved surface FF3 may be bent with respect to a bending axis (not shown) that is lengthwise extended parallel to the first direction D1. Accordingly, the first direction D1 and the second curved surface FF2 may be lengthwise extended parallel to each other, and may not cross each other. Likewise, the first direction D1 and the third curved surface FF3 may be lengthwise extended parallel to each other, and may not cross each other.

The spacer 200' may include a flexible material. Since the spacer 200' includes a flexible material, the spacer 200' may include or define the second curved surface FF2 and be bent at various angles with respect to the bending axis. The flexible material will be described in more detail in FIG. 3.

Remaining components of FIG. 2B are the same as those described in FIG. 2A, and thus description for them will be omitted.

Figure 3:
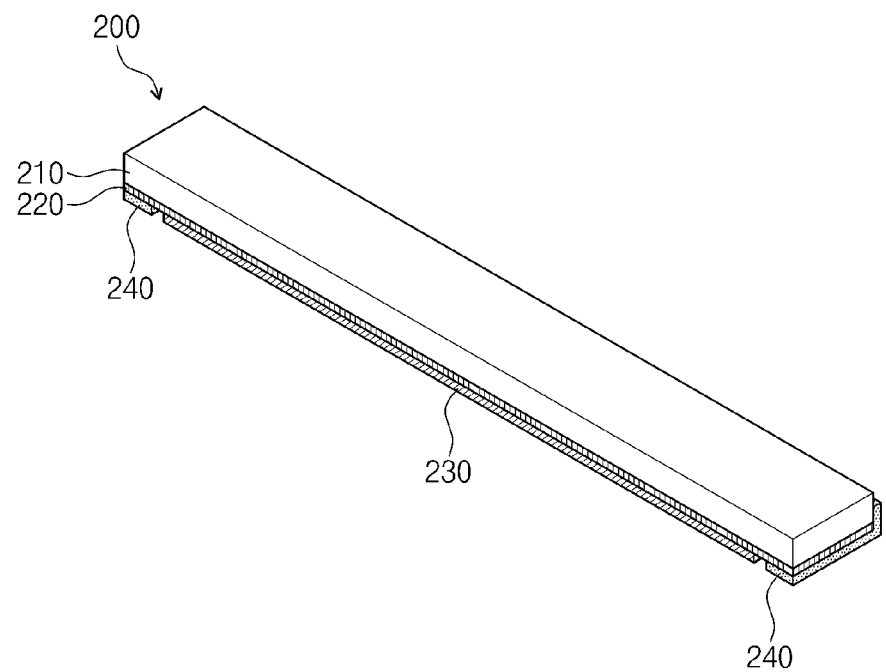
FIG. 3 is a perspective view of an exemplary embodiment of a spacer according to the invention.
Figure 4:
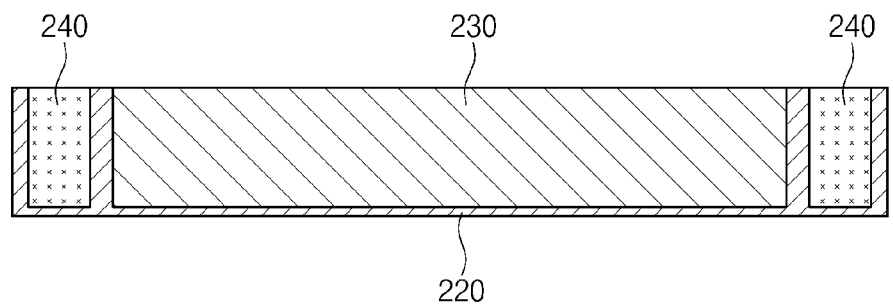
FIG. 4 is an exemplary embodiment of a rear view of the spacer in FIG. 3. according to the invention.

FIG. 3 is a perspective view of an exemplary embodiment of a spacer according to the invention, and FIG. 4 is an exemplary embodiment of a rear view of the spacer in FIG. 3 according to the invention.

Referring to FIGS. 1 to 4, the spacer 200 includes the body portion 210 and the printed layer 220 which is disposed on at least one surface selected from the opposing top and bottom surfaces of the body portion 210.

The body portion 210 may include a tempered glass or polymer resin. In an exemplary embodiment, for example, the body portion 210 may include or be made of acrylic resin such as poly dimethy siloxane, poly silicon, poly-urethane, styrene block copolymer, and polymethylmethacrylate ("PMMA"), polycarbonate and polyethylene terephthalate ("PET").

Where the body portion 210 includes or is made of the polymer resin instead of the tempered glass, manufacturing costs in a process of manufacturing the display panel may be reduced. Also, where the body portion 210 includes or is made of the polymer resin, a shape of the spacer 200 may be easily changed, and a shape of the curved surface of the display panel may be easily realized as illustrated in FIG. 2B.

The printed layer 220 may be disposed on the body portion 210 such as by being printed using an ink including mineral pigments, organic pigments and dyes. Although the printed layer 220 may have a black color to efficiently block light at the pad area PAD, the invention is not limited thereto. In an exemplary embodiment, for example, the printed layer 220 may have a specific color.

In a direction from front to rear surfaces of elements within the display device, although the printed layer 220 is disposed below the body portion 210 in the drawings, the invention is not limited thereto. In an exemplary embodiment, for example, the printed layer 220 may be disposed above the body portion 210 or disposed on each of opposing top and bottom surfaces of the body portion 210.

The spacer 200 may be attached to the pad area PAD of the first display substrate 111 and/or a surface of the upper polarizing plate 113a by the adhesion member 230. The adhesion member 230 may be, e.g., a double-sided tape.

Also, a conductive coating layer 240 may be disposed between the first display substrate 111 and the spacer 200 to reduce or effectively prevent static electricity therebetween. The plurality of pads 112a disposed on the pad area PAD of the first substrate 111 may be arranged along a length of the pad area PAD such as in the first direction D1. Outermost pads 112a may be disposed at opposing ends of the pad area PAD in the first direction D2. In an exemplary embodiment, a portion of the conductive coating layer 240 may be disposed on at least one edge of the rear surface of the spacer 200 to contact an outermost pad of the plurality of pads 112a disposed on the pad area PAD of the first display substrate 111.

In an exemplary embodiment, for example, the conductive coating layer 240 may be a silver (Ag) dot, and the outermost pad 112a may be a ground wiring. The outermost pad may have a planar area in the top plan view of the first display substrate 111 greater than that of a remainder of the pads 112a to provide a relatively wide contact area for connection with the conductive coating layer 240.

According to an exemplary embodiment of the invention, the spacer 200 with the conductive coating layer 240 thereon may discharge static electricity introduced into the first display substrate 111 to the outside the display panel 110 through the outermost pad 112a and the conductive coating layer 240 to reduce or effectively prevent product failures caused by the static electricity.

Figure 5:
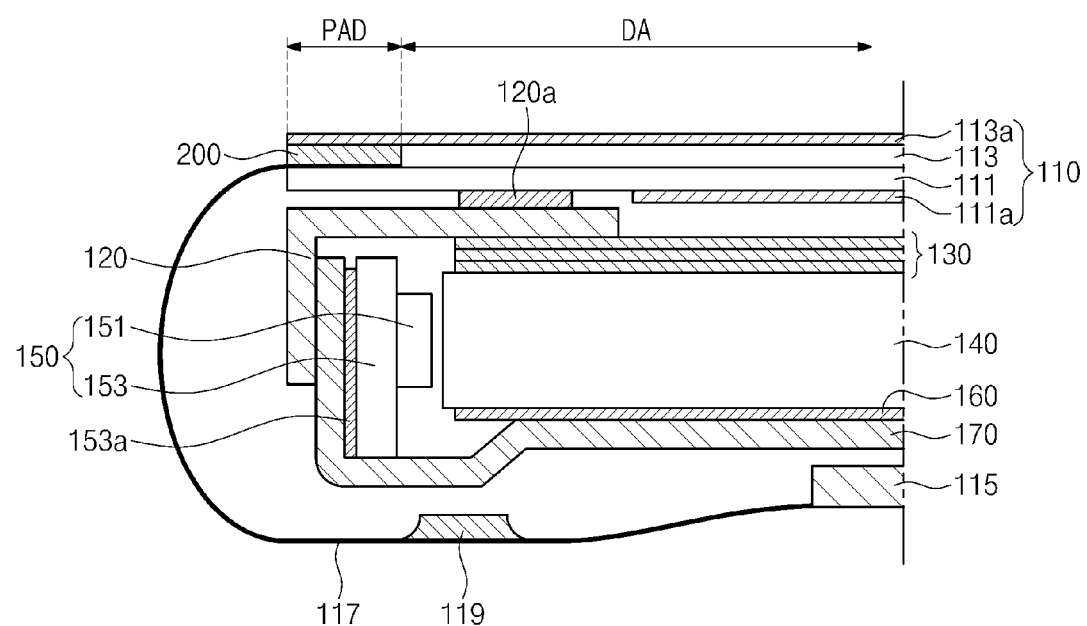
FIG. 5 is a cross-sectional view of an exemplary embodiment of a display device according to the invention.

FIG. 5 is a cross-sectional view of an exemplary embodiment of a display device according to the invention.

Referring to FIG. 5, the display device may include a display panel 110, a middle frame 120, an optical sheet 130, a light guide plate 140, a light source member 150, a reflective sheet 160 and a lower frame 170. The display panel 110 may define the frontmost component of the display device.

The display panel 110 includes a first display substrate 111 including a display area DA and a pad area PAD which is disposed on one edge of the display area DA, a second display substrate 113 disposed on the display area DA of the first display substrate 111, a liquid crystal layer 300 disposed between the first and second display substrates 111 and 113, a spacer 200 disposed on the pad area PAD of the first display substrate 111, a lower polarizing plate 111a disposed on a rear surface of the first display substrate 111, and an upper polarizing plate 113a extended to be disposed on top surfaces of the second display substrate 113 and the spacer 200. Detailed description for the display panel 110 is previously described and thus will be omitted.

The middle frame 120 overlaps an edge of a rear surface of the display panel 110 to support the display panel 110 thereon and provide a space in which the optical sheet 130, the light guide plate 140, the light source member 150 and the reflective sheet 170 are accommodated.

An adhesion member 120a may be disposed between the middle frame 120 and the display panel 110. The adhesion member 120a may be, e.g., a double-sided tape.

In a top plan view of the display device, the middle frame 120 may have a polygonal frame shape in which an opening defined to expose the optical sheet 130 thereunder. In an exemplary embodiment, for example, the middle frame 120 may have a rectangular frame shape in which an opening space is defined. The middle frame 120 may be a single unitary member or may be formed by a plurality of pieces assembled to form the middle frame 120.

The middle frame 120 may include at least one selected from an epoxy resin composition, a silicon resin composition, a modified epoxy resin composition such as a silicone modified epoxy resin composition, a modified silicon resin composition such as an epoxy modified silicon resin, a polyimide resin composition, a modified polyimide resin composition, polyphthalamide ("PPA"), a polycarbonate resin, polyphenylene sulfide ("PPS"), a liquid crystal polymer ("LCP"), an acrylonitrile butadiene styrene ("ABS") resin, a phenol resin, an acrylic resin, a polybutylene terephthalate ("PBT") resin, and a combination thereof.

The optical sheet 130 is disposed on the light guide plate 140 to diffuse and/or collect light transferred from the light guide plate 140. The optical sheet 130 may collectively include plural individual sheets such as a diffusion sheet, a prism sheet and a protection sheet. The diffusion sheet, the prism sheet and the protection sheet are sequentially laminated on the light guide plate 140 in the stated order from the light guide plate 140.

The prism sheet collects light guided by the light guide plate 140, the diffusion sheet diffuses light collected by the prism sheet, and the protection sheet protects the prism sheet. Light passed through the protection sheet is provided toward the display panel 110.

The light guide plate 140 uniformly provides light provided from the light source member 150 to the display panel 110. Although the light guide plate 140 has a rectangular plate shape in the cross-sectional view, the invention is not limited thereto. In an exemplary embodiment, for example, the light guide plate 140 may have various shapes having a predetermined groove and/or protrusion defined therein or thereon according to a position of the light source.

Although the light guide plate 140 is described as a plate such as having a relatively large cross-sectional thickness for convenience of description, the invention is not limited thereto. In exemplary embodiments, the light guide plate 140 may be formed in a sheet or film shape for which the cross-sectional thickness is smaller than that of the plate and is relatively small as compared to the planar size thereof to achieve overall slimness of the display device. That is, the light guide plate 140 may include a plate and a film for guiding light provided from the light source member 150.

The light guide plate 140 may include or be made of a transparent material, e.g., acrylic resin such as polymethylmethacrylate ("PMMA") and polycarbonate, to efficiently guide light.

The light source member 150 includes a light source 151 and a printed circuit board 153 on which the light source 151 is mounted.

The light source 151 may be disposed at an edge portion or light incident side surface of the light guide plate 140. That is, the light source 151 may generate and emit light toward the edge portion or light incident side surface of the light guide plate 140. The light source 151 may be at least one among a light emitting diode ("LED") and a light emitting diode chip. In an exemplary embodiment, for example, the light source 151 may be a gallium nitride (GaN) based LED that generates and emits blue light. The number of the light source 151 may have various values in consideration of the size and luminance uniformity of the display panel 110. That is, the light source 151 may be provided in plural on the printed circuit board 153 and arranged along a length thereof such as in the first direction D1.

The printed circuit board 153 may be one of a metal printed circuit board ("MPCB") and a metal core printed circuit board ("MCPCB"). The printed circuit board 153 may be fixed to the lower frame 170 by an adhesion member 153a. The adhesion member 153a may be, e.g., a double-sided tape.

Although not shown in FIG. 5, a wavelength conversion member (not shown) may be disposed between the light guide plate 140 and the light source member 150. The wavelength conversion member (not shown) may include a material which converts a wavelength of light. In an exemplary embodiment, for example, the wavelength conversion member may convert blue light emitted from LED to white light by changing the wavelength of the blue light into a different wavelength.

The reflective sheet 160 may include or be made of, e.g., polyethylene terephthalate ("PET") to have reflexibility and have one surface of a body thereof coated with a diffusion layer such as including titanium dioxide so that the reflective sheet 160 is reflective. Also, the body of the reflective sheet 160 may include or be made of a material including metal such as silver (Ag) so as to be reflective.

The lower frame 170 maintains an overall framework or shape of the display device and protects components of the display device accommodated therein. The lower frame 170 may include or be formed of a metallic material having excellent stiffness and radiation characteristics. In an exemplary embodiment, for example, the lower frame 170 may include at least one selected from stainless steel, aluminum, an aluminum alloy, magnesium, a magnesium alloy, copper, a copper alloy, and an electronic galvanized sheet.

Accordingly, one or more exemplary embodiment of the display panel and the display device including the same according to the invention may use a light blocking member disposed at the edge of the second display substrate and the spacer of which at least one surface thereof includes the printed layer is disposed, to reduce or effectively prevent the non-display area of the display device from being seen even where a conventional display device cover window is omitted.

Where a frontmost cover window disposed on a display panel within a display device is omitted, manufacturing costs of the display device may be reduced, and assembly of components of the display device may be simplified. Furthermore, where the frontmost cover window is omitted, a relatively slim display device may be realized.

Therefore, according to one or more exemplary embodiment of the invention, a display panel and a display device including the same may omit a frontmost cover window disposed on the display panel of a conventional display device to reduce the manufacturing costs of the display device according to the invention and simplify the assembly of the display device thereof.

Also, according to one or more exemplary embodiment of the invention, a display panel and a display device including the same may omit the frontmost cover window disposed on the display panel to realize a relatively slim display device according to the invention.

Although exemplary embodiments of the invention have been described, it is understood that the invention should not be limited to these exemplary embodiments but various changes and modifications can be made by one ordinary skilled in the art within the spirit and scope of the invention as hereinafter claimed. Thus, the above-disclosed exemplary embodiments are to be considered illustrative and not restrictive.

What is claimed is:

1. A display panel comprising:
   a first substrate defining a display area thereof in which an image is displayed and a pad area thereof which is disposed extended from an edge of the display area and in which the image is not displayed;
   a second substrate disposed overlapping the display area of the first substrate;
   a spacer disposed on the pad area of the first substrate; and
   an upper polarizing plate disposed on the second substrate, the upper polarizing plate extended further than the second substrate to be disposed on the spacer on the pad area of the first substrate,
   wherein the spacer comprises a body portion and a light-blocking layer which is disposed on a surface of the body portion.

2. The display panel of claim 1, wherein the light-blocking layer is disposed between the first substrate and the body portion.

3. The display panel of claim 1, wherein the light-blocking layer is disposed between the body portion and the upper polarizing plate.

4. The display panel of claim 1, wherein the body portion comprises a tempered glass or polymer resin.

5. The display panel of claim 1, further comprising a conductive coating layer disposed between the first substrate and the spacer.

6. The display panel of claim 1, further comprising an adhesion member disposed between the first substrate and the spacer.

7. The display panel of claim 1, further comprising:
   a plurality of pads which is disposed in the pad area of the first substrate and provides driving signals to the display area of the first substrate to drive the display area, and
   a flexible printed circuit board which is connected to the plurality of pads and provides the driving signals to the plurality of pads.

8. The display panel of claim 1, further comprising a light blocking member disposed on an edge of the second substrate, the edge of the second substrate adjacent to the pad area of the first substrate.

9. The display panel of claim 1, wherein a height defined from the first substrate to a top surface of the second substrate overlapping the display area of the first substrate is substantially the same as that from the first substrate to a top surface of the spacer on the pad area of the first substrate.

10. The display panel of claim 1, wherein the spacer on the pad area of the first substrate contacts the second substrate overlapping the display area of the first substrate.

11. The display panel of claim 1, further comprising a liquid crystal layer disposed between the first substrate and the second substrate.

12. The display panel of claim 1, further comprising a lower polarizing plate disposed on a rear surface of the first substrate.

13. A display device comprising:
   a display panel configured to display an image; and
   a frame configured to overlap an edge of a rear surface of the display panel to support the display panel thereon,
   wherein the display panel comprises:
   a first substrate defining a display area thereof in which the image is displayed and a pad area thereof which is disposed adjacent to an edge of the display area and in which the image is not displayed;
a second substrate disposed overlapping the display area of the first substrate;
a spacer disposed on the pad area of the first substrate; and
an upper polarizing plate disposed on the second substrate, the upper polarizing plate extended further than the second substrate to be disposed on the spacer on the pad area of the first substrate,
wherein the spacer comprises a body portion and a light-blocking layer disposed on a surface of the body portion.

14. The display device of claim 13, wherein the light-blocking layer is disposed between the first substrate and the body portion.

15. The display device of claim 13, wherein the light-blocking layer is disposed between the body portion and the upper polarizing plate.

16. The display device of claim 13, wherein the body portion comprises a tempered glass or polymer resin.

17. The display device of claim 13, further comprising a conductive coating layer disposed between the first substrate and the spacer.

18. The display device of claim 13, further comprising a light blocking member disposed on an edge of the second substrate, the edge of the second substrate adjacent to the pad area of the first substrate.

19. The display device of claim 13, wherein a height defined from the first substrate to a top surface of the second substrate overlapping the display area of the first substrate is substantially the same as that from the first substrate to a top surface of the spacer on the pad area of the first substrate.

20. The display device of claim 13, wherein the spacer on the pad area of the first substrate contacts the second substrate overlapping the display area of the first substrate.

21. A display panel comprising:
a first substrate defining a display area thereof in which an image is displayed and a non-display area thereof which extends from an edge of the display area and in which the image is not displayed;
a second substrate disposed overlapping the display area of the first substrate;
a spacer disposed on the non-display area of the first substrate; and
a polarizing plate disposed on the second substrate, the polarizing plate extended further than the second substrate to be attached to the spacer on the non-display area of the first substrate,
wherein the spacer comprises a body portion and a light-blocking layer which is disposed on a surface of the body portion.

22. The display panel of claim 21, wherein
the non-display area of the first substrate further defines a pad area of the first substrate, the pad area lengthwise extending in a first direction.

23. The display panel of claim 22, wherein
the non-display area comprises a first curved surface of the first substrate;
the spacer further comprises a second curved surface thereof corresponding to the first curved surface of the first substrate, and
the second curved surface is bent with respect to a bending axis that is lengthwise parallel to the first direction.

24. The display panel of claim 21, wherein the light-blocking layer is disposed between the body portion and the polarizing plate.

25. The display panel of claim 21, wherein the body portion is disposed between the light-blocking layer and the polarizing plate.

* * * * *